United States Patent
Agrawal et al.

(10) Patent No.: US 12,154,346 B2
(45) Date of Patent: Nov. 26, 2024

(54) ESTIMATING OBJECT UNCERTAINTY USING A PRE-NON-MAXIMUM SUPPRESSION ENSEMBLE

(71) Applicant: GM CRUISE HOLDINGS LLC, San Francisco, CA (US)

(72) Inventors: Pranay Agrawal, San Francisco, CA (US); Yong Jae Lee, Walnut Creek, CA (US); Chiyu Jiang, Sunnyvale, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 473 days.

(21) Appl. No.: 17/554,667

(22) Filed: Dec. 17, 2021

(65) Prior Publication Data
US 2023/0196787 A1   Jun. 22, 2023

(51) Int. Cl.
*G06V 20/00* (2022.01)
*G06V 10/74* (2022.01)
*G06V 20/58* (2022.01)

(52) U.S. Cl.
CPC ............ *G06V 20/58* (2022.01); *G06V 10/761* (2022.01)

(58) Field of Classification Search
CPC ............................ G06V 20/58; G06V 10/761
See application file for complete search history.

(56) References Cited

U.S. PATENT DOCUMENTS

| | | | |
|---|---|---|---|
| 2019/0258878 A1* | 8/2019 | Koivisto | G06V 10/46 |
| 2021/0181758 A1* | 6/2021 | Das | G06V 30/2552 |
| 2021/0237761 A1* | 8/2021 | Das | G06T 7/248 |
| 2021/0276595 A1* | 9/2021 | Casas | G06V 30/19173 |
| 2022/0164582 A1* | 5/2022 | Raghavan | G06F 18/2115 |
| 2023/0005173 A1* | 1/2023 | Tan | G06V 20/56 |
| 2023/0012257 A1* | 1/2023 | Player | G01S 17/66 |
| 2023/0211808 A1* | 7/2023 | Shah | G06T 7/246 |
| | | | 701/28 |

* cited by examiner

*Primary Examiner* — Md K Talukder
(74) *Attorney, Agent, or Firm* — Michael DiCato

(57) ABSTRACT

Methods and systems are provided for detecting objects by utilizing uncertainties. In some aspects, a process can include steps for receiving, by an autonomous vehicle system, a frame of a scene with a detected object; estimating, by the autonomous vehicle system, an overall probability of the detected object in the frame; estimating, by the autonomous vehicle system, covariances for each state of at least one bounding box; and balancing, by the autonomous vehicle system, confidence values of the at least one bounding box based on the overall probability of the detected object and the covariances of each state of the at least one bounding box.

17 Claims, 7 Drawing Sheets

ESTIMATING OBJECT UNCERTAINTY USING A PRE-NON-MAXIMUM SUPPRESSION ENSEMBLE

BACKGROUND

1. Technical Field

The subject technology provides solutions for autonomous vehicle systems and in particular, for improving object detection by utilizing uncertainties of an unidentified object.

2. Introduction

Autonomous vehicles are vehicles having computers and control systems that perform driving and navigation tasks that are conventionally performed by a human driver. As autonomous vehicle technologies continue to advance, ride-sharing services will increasingly utilize autonomous vehicles to improve service efficiency and safety. However, autonomous vehicles will be required to perform many of the functions that are conventionally performed by human drivers, such as avoiding dangerous or difficult routes, and performing other navigation and routing tasks necessary to provide safe and efficient transportation. Such tasks may require the collection and processing of large quantities of data disposed on the autonomous vehicle.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Figure 1:
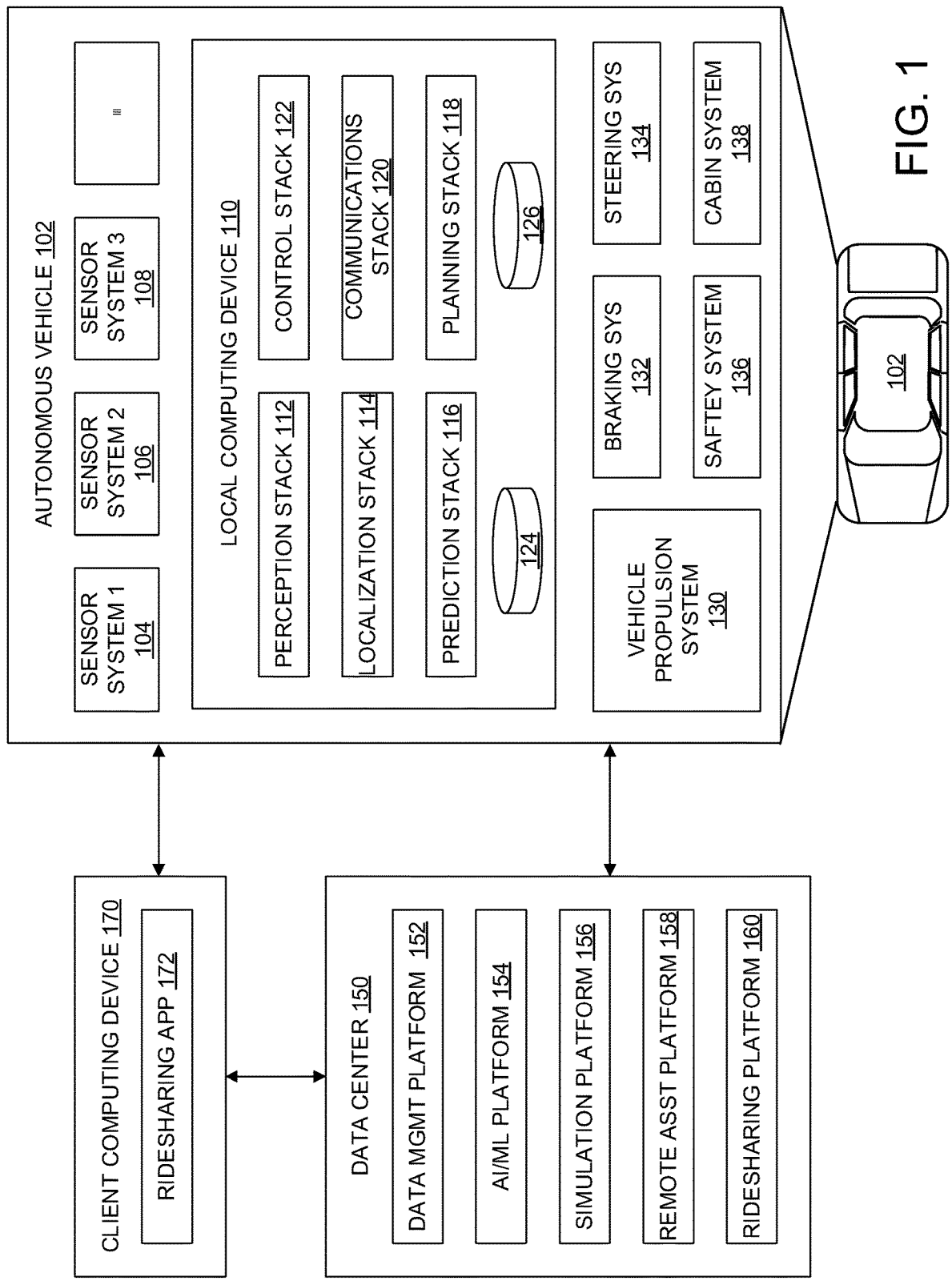
FIG. 1 illustrates an example of a system for managing one or more Autonomous Vehicles (AVs), according to some aspects of the disclosed technology.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform 162; modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

Ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Traditionally, object detection processes include problems such as perception detection of unknown objects. For example, when a pedestrian crosses a street, the autonomous vehicle may not be completely sure whether the detected object is a pedestrian or a different object. Background noise can distort data, and in this example, the pedestrian may blend into the background of a bus.

Moreover, heading/centroid/size of objects that are detected by PointPillars can oscillate over time, leading to poor track heading and prediction. PointPillars does not provide a tracker of how confident it is in these measurements. For example, PointPillars does not output a confidence per object and has a high default association cost.

Trackers also use prior poor detections that fit a track instead of newer, more precise detection. Without a quality signal, the tracker has no reason to believe that the more recent information is better than current information. As such, the tracker will favor a larger number of consistent prior detections.

Currently, PointPillars reports a constant covariance matrix that is calculated by computing an error distribution over all test samples. This limits the ability to provide a correct estimate for every detection output. The covariance matrix values are manually hardcoded into a model. The fixed values do not inform the tracker how probable each detection parameter is for updating or generating a new track.

Along with that, the probability of detection is currently based on a classification probability that may not be correlated with an FP rate or detection quality/IoU. Thus, the tracker cannot change an association cost dynamically per detection.

As such, a need exists to utilize different uncertainties for an unidentified object in a single frame to improve object detection. For example, an implementation of the present disclosure can include propagating information about uncertainty of a detected object further downstream to provide more accurate object detection.

Figure 2:
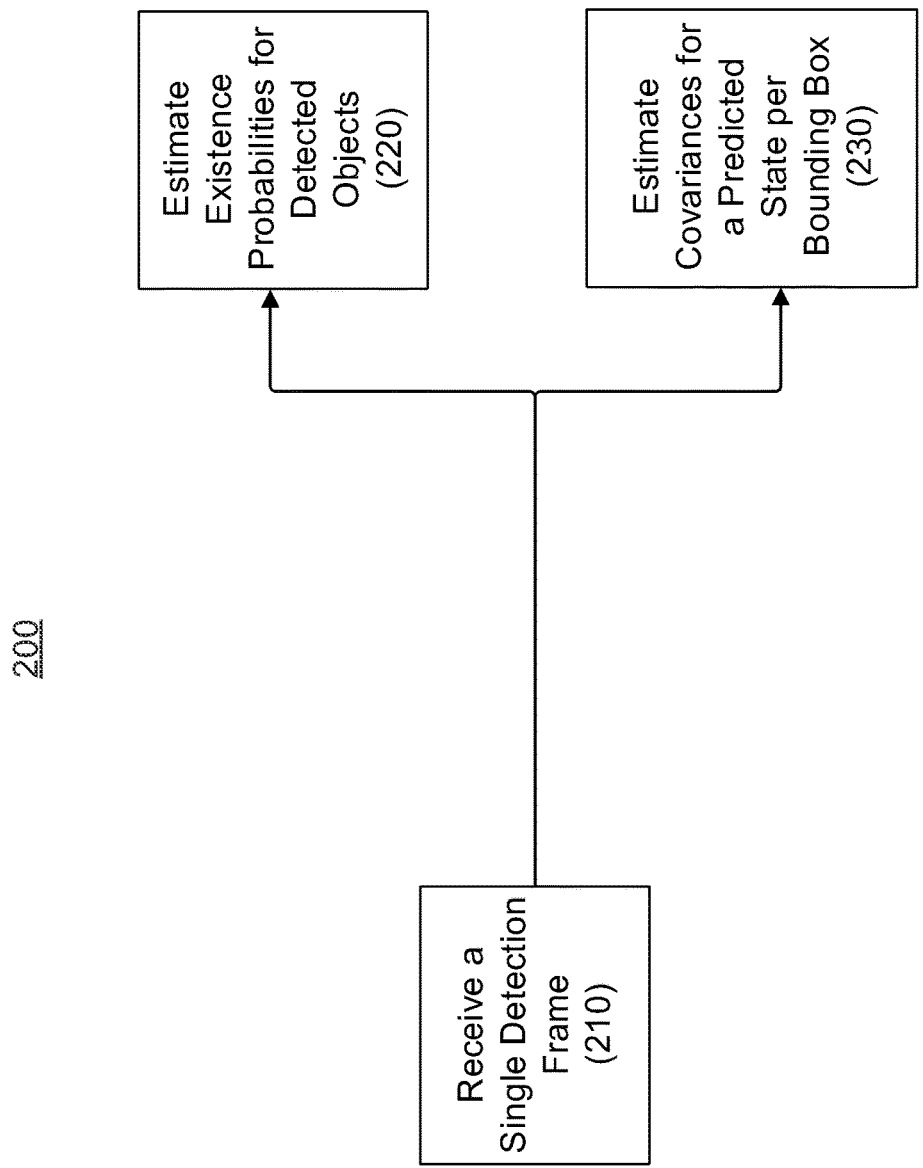
FIG. 2 illustrates an example block diagram of a pre-non-maximum suppression (pre-NMS) ensemble system, according to some aspects of the disclosed technology.

FIG. 2 illustrates an example block diagram of a pre-non-maximum suppression (NMS) ensemble process 200, according to some aspects of the disclosed technology. A non-maximum suppression can be a technique that filters proposals based on a pre-determined criteria.

In some implementations, the pre-NMS ensemble process 200 can include calculating an object uncertainty estimation as part of a detection process that can then be communicated downstream. For example, the pre-NMS ensemble process 200 can include estimating two types of uncertainties: 1) an overall probability of an existence per detection; and 2) estimating a covariance between each predicted state per bounding box (e.g., centroid, heading, width, and length). In some examples, the pre-NMS ensemble process 200 can utilize an ensemble of pre-NMS boxes to estimate both of these uncertainties. For example, the pre-NMS ensemble process 200 can utilize a distance metric to compute how close together different pre-NMS proposals are for an object and scale that to a single value for computing an existence probability. The distance metric can further be utilized by the pre-NMS ensemble process 200 for accurate grid-based computation of covariance estimation of bounding boxes.

In other implementations, pre-NMS ensemble process 200 can be used to estimate two or more different uncertainties from a single detection frame, and use an ensemble of pre-NMS bounding boxes for bounding box covariance estimation.

In some embodiments, the pre-NMS ensemble process 200 can include a step 210 of receiving a single detection frame. The pre-NMS ensemble process 200 can further include a step 220 of estimating a probability of a detected object. The pre-NMS ensemble process 200 can also include a step 230 of estimating covariances for a predicted state per bounding box. The pre-NMS ensemble process 200 can additionally include a step 240 of balancing/normalizing a PointPillar confidence (e.g., a confidence value or character).

In some examples, step 220 of the pre-NMS ensemble process 200 can include estimating the overall probability of existence per detection and utilizing the overall probability in conjunction with an estimated covariance (e.g., step 230) to track and modify an association cost of PointPillars detections. For example, an overall existence probability can be determined by: 1) estimating an expected intersection over unition (IoU) with associated ground-truth (GT) objects; and 2) estimating a true-positive (TP) rate based on a fixed IoU threshold and a many-to-one association, i.e., based on multiple predictions by the model that can all be mapped to the same GT object.

Step 230 of the pre-NMS ensemble process 200 can include estimating a covariance for each predicted state per bounding box (e.g., centroid, heading, width, and length) that can be provided to a tracker. The covariance can be estimated by: 1) using a fixed covariance matrix per class; 2) using a polynomial fit or look-up-table from detections compared to ground truth, where the polynomial fit can be a function of attributes that are measurable online; and 3) modifying a model to estimate the covariance per-detection.

In some implementations, the two types of uncertainties from steps 220, 230 can be utilized to generate uncertainty values or scores that can then be utilized downstream. In some examples, step 220 of the pre-NMS ensemble process 200 can include estimating or determining the uncertainty values between a range of 0 to 1. For example, a value of 1 can be a real object (e.g., a true positive) and a value of 0 may not be a real object and a false positive.

In other implementations, step 230 of the pre-NMS ensemble process 200 can include estimating the covariance for a predicted state per bounding box. For example, a bounding box can include different states such as a length with centroid heading. Some examples include determining a covariance for each of the states of the bounding box to generate an overall bounding box covariance.

In some embodiments, the pre-NMS ensemble process 200 can include measuring uncertainties or the volume loss, isolating a start prediction model, and determining states of a bounding box including a heading, a length, a width, and a centroid for the bounding box. The pre-NMS ensemble process 200 can then determine confidence levels of each of these states for the bounding box with the various process as described herein. In some examples, a covariance can be determined for each of states of the bounding boxes, which can then be scaled. In other examples, the pre-NMS ensemble process 200 can estimate the bounding box covariances and the aggregate that by propagating the uncertainties downstream to be utilized by the autonomous vehicle.

The estimated covariance of step 230 of the pre-NMS ensemble process 200 can also be a combined covariance. For example, a covariance can be determined for each bounding box in frame. The pre-NMS ensemble process 200 can then combine all of the covariances from each of the bounding boxes to generate a total or a single covariance of the detected object.

In some implementations, the pre-NMS ensemble process 200 can utilize a distance metric that can be calculated by determining how close together different proposals are of an object and scaling that to a single value. The closer the bounding boxes are to one another, the greater the certainty of the detected object, and vice versa. If there are various contradictions (e.g., the bounding boxes are far apart from one another, this may imply that the model or autonomous vehicle may not be sure of the identity of the detected object. For example, in a frame with a pedestrian having multiple bounding boxes around them, the distance between each of the respective corners of the bounding boxes can represent a confidence level in the bounding boxes. The greater the distance between the respective corners of each bounding box, the less of a confidence value there is (e.g., closer to a confidence value of 0). The smaller the distance between the respective corners of each bounding box, the greater the confidence value (e.g., closer to a confidence value of 1). Depending on the desired implementation, various other distance metrics may be used. By way of example, various distance metrics that are based on statistical measures of bounding box state (e.g., position and size), such as standard deviations of bounding box state, may be used. It is understood that other distance metrics may be utilized, without departing from the scope of the disclosed technology.

Figure 3:
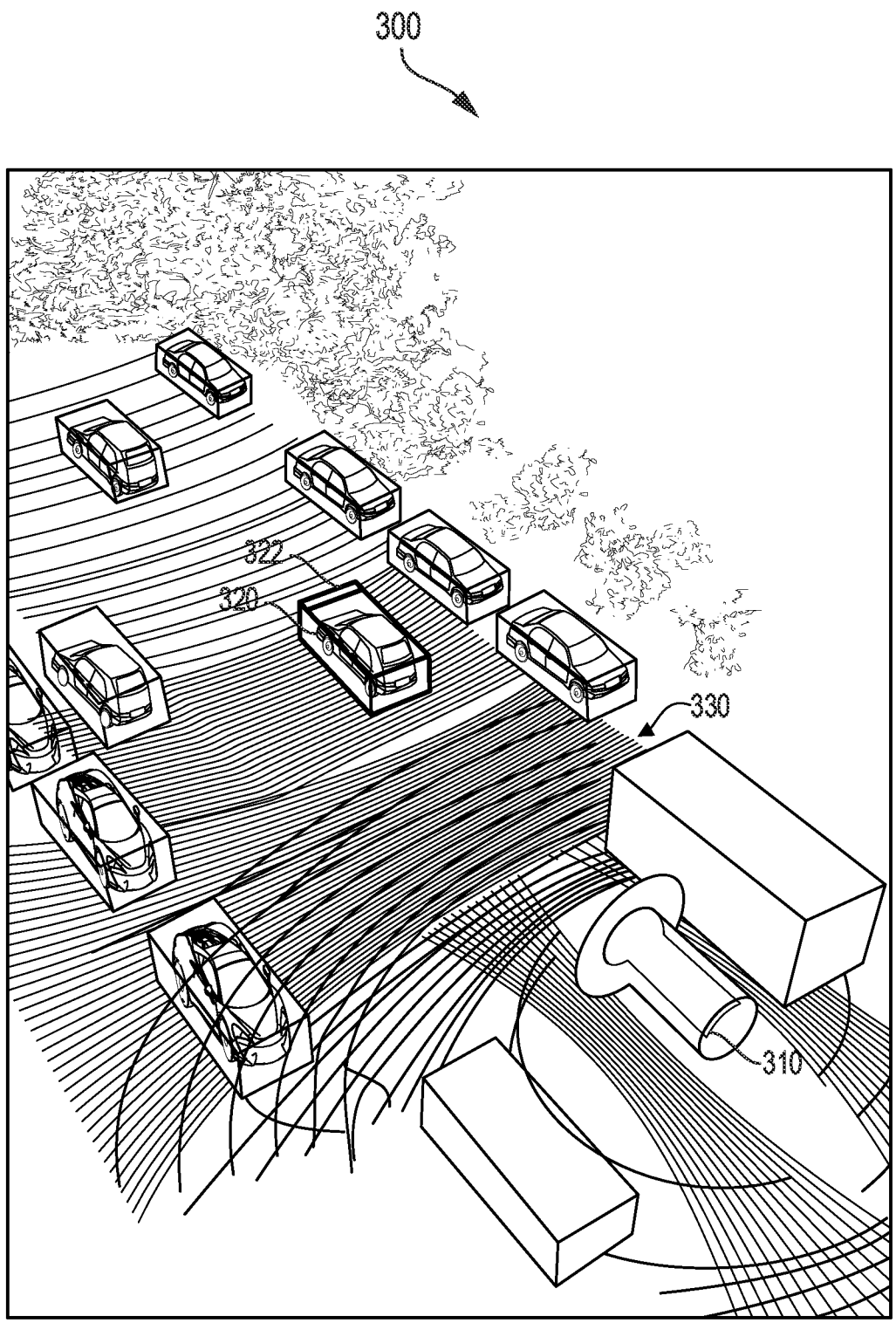
FIG. 3 illustrates an example system used for utilizing a pre-NMS box ensemble, according to some aspects of the disclosed technology.

FIG. 3 illustrates an example system used for utilizing a pre-non-maximum suppression (pre-NMS) box ensemble 300, according to some aspects of the disclosed technology. In some implementations, a scene can include an autonomous vehicle (AV) 310 that can utilize the pre-NMS box ensemble systems and processes as described herein. The autonomous vehicle 310 can provide and receive signals 330 (e.g., by utilizing sensors, cameras, radar, lidar, etc.) to detect an object 320. The autonomous vehicle 310 can further generate bounding boxes 322 around detected objects (e.g., vehicle 320). In some implementations, multiple bounding boxes can be generated, out of which a single bounding box may be selected, e.g., based on a corresponding probability of bounding box accuracy.

In other implementations, an interactive tool can be utilized (e.g., by developers) to visualize the pre-NMS detection boxes 322. As shown in FIG. 3, the selected, detected object 320 (e.g., vehicle), there are nine overlapping boxes (e.g., bounding boxes 322), eight of which include high confidences, and for a spurious detection, one box has a low confidence rating. Additionally, based on the ensemble of the bounding boxes 322, variances for each of the bounding box parameters can be predicted as described herein.

Figure 4:
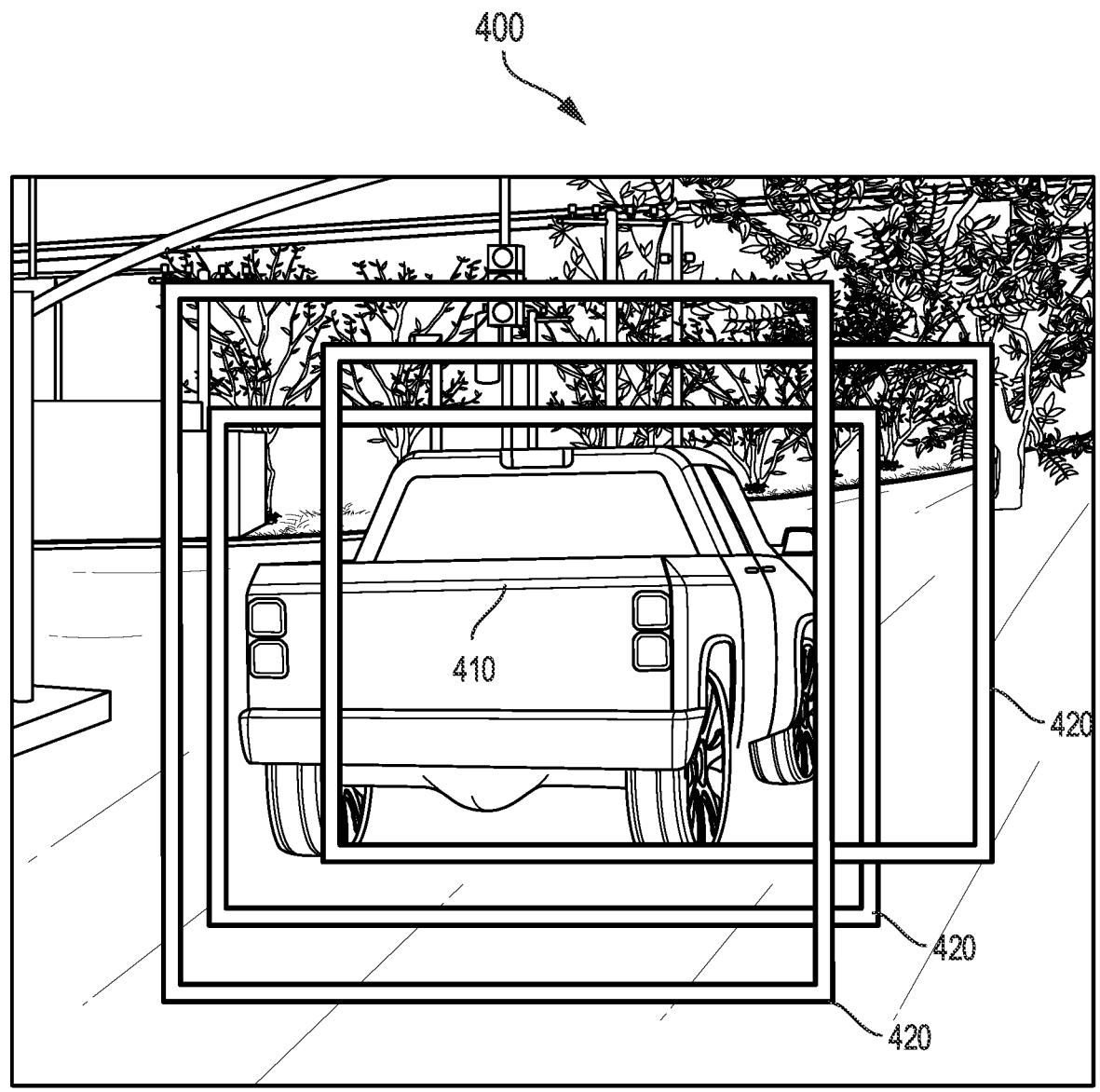
FIG. 4 illustrates a perspective view of a vehicle with an example before non-max suppression utilization, according to some aspects of the disclosed technology.
Figure 5:
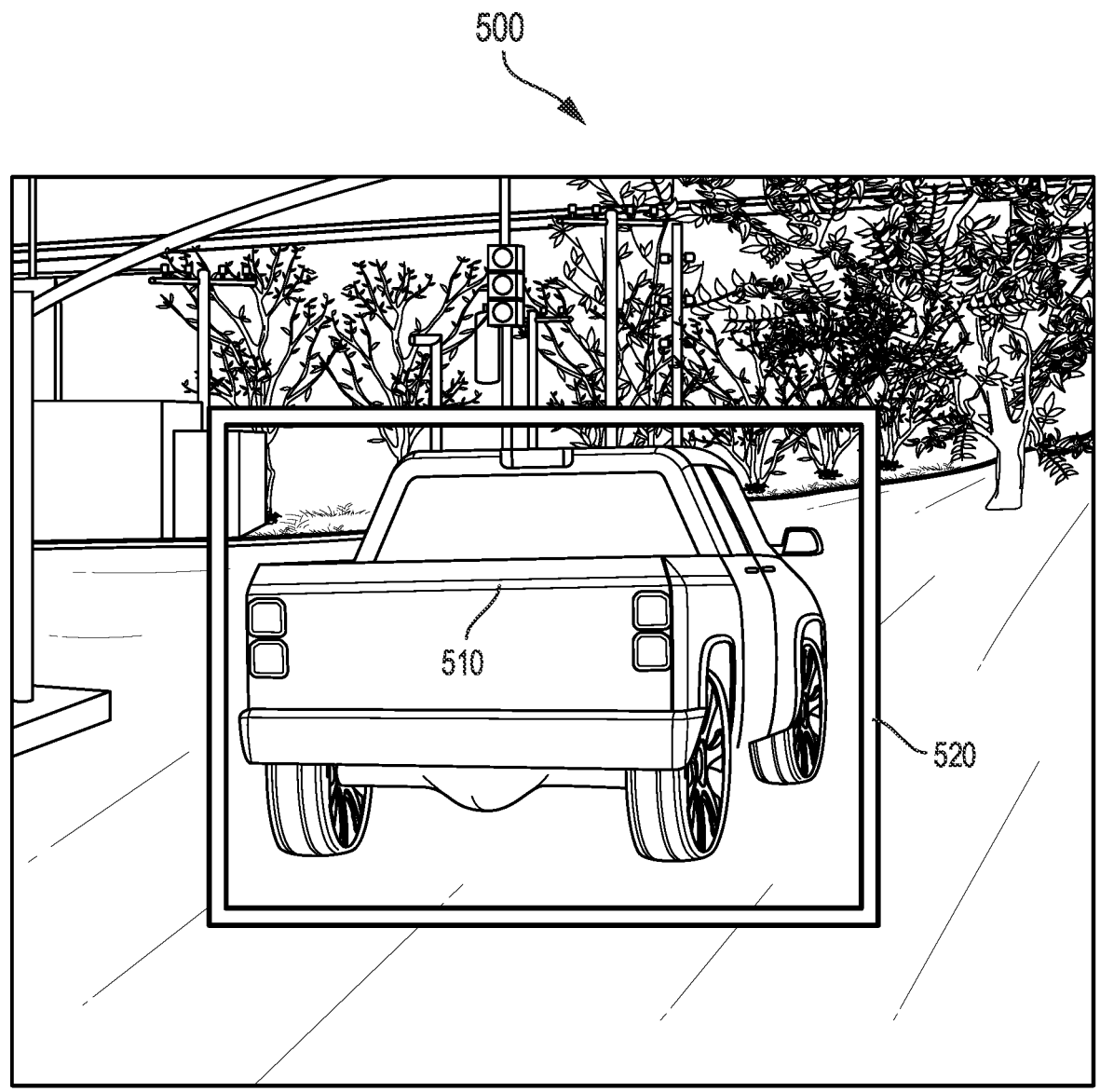
FIG. 5 illustrates a perspective view of a vehicle with an example after non-max suppression utilization, according to some aspects of the disclosed technology.

FIGS. 4 and 5 illustrate perspective views of a vehicle 410, 510 with example before and after non-max suppression (NMS) utilizations 400, 500, according to some aspects of the disclosed technology.

As shown in FIG. 4, the NMS process can generate initial bounding boxes 420 around a detected object 410. By utilizing the NMS process as described herein, the bounding box 520 of FIG. 5 with the highest confidence can be retained, while removing the other bounding boxes with a lower confidence value. For example, as described herein, the NMS process can be utilized to determine whether the detected object is a truck. In some examples, uncertainties can be calculated for each of the bounding boxes, or distance metrics can be utilized to determine confidence values of each of the bounding boxes. If the bounding boxes are close together, there may be a high likelihood of the detected object. If the bounding boxes are far apart, then there may be a low existence probability of a detected object. In some aspects, the bounding boxes and/or the distance metric (e.g., the distance between bounding boxes associated with a common object), may be used to generate one or more state covariance matrix per bounding box.

Figure 6:
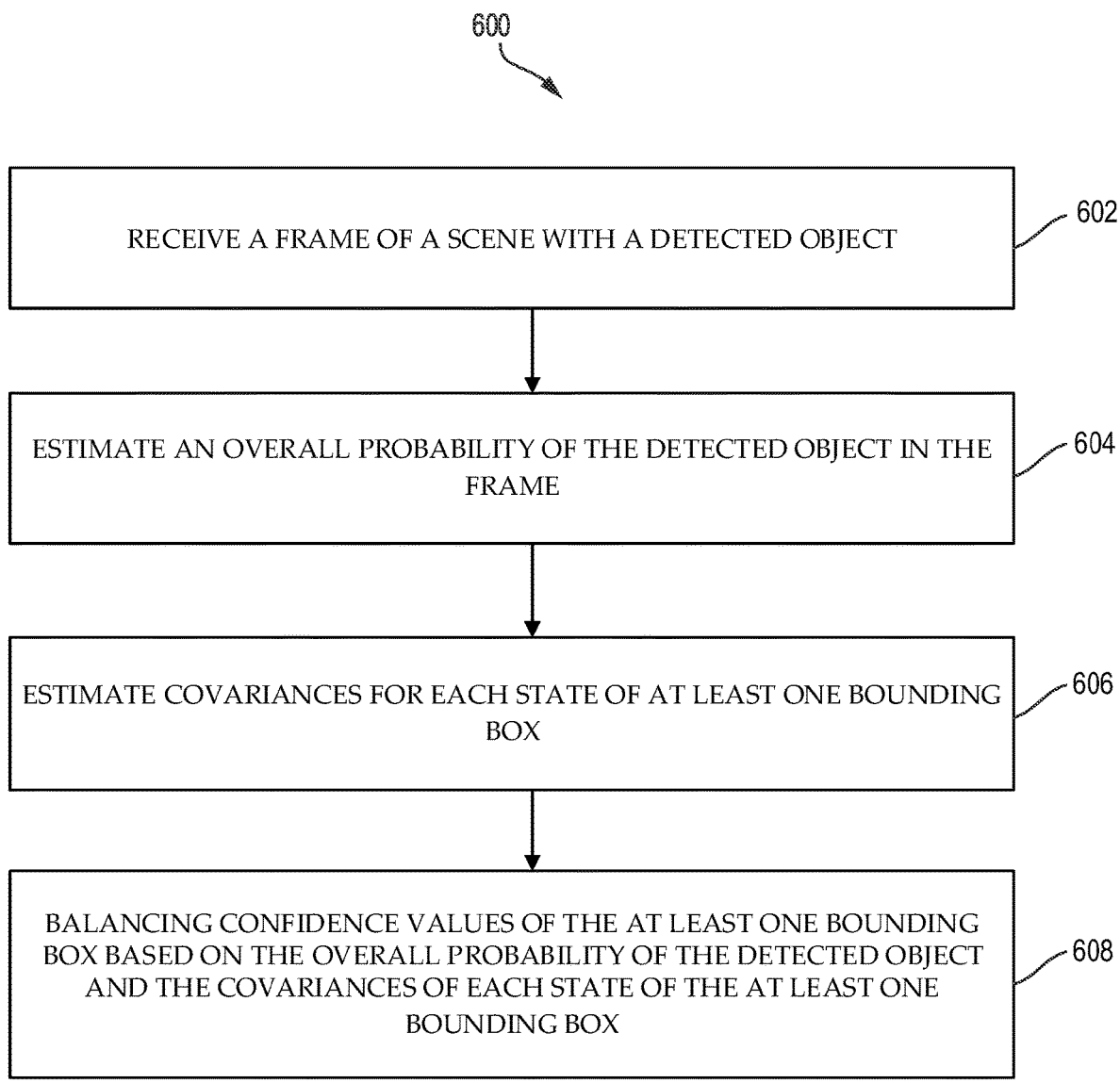
FIG. 6 illustrates an example process for improving object detection by utilizing uncertainties of an unidentified object, according to some aspects of the disclosed technology.

Having disclosed some example system components and concepts, the disclosure now turns to FIG. 6, which illustrates an example method 600 for improving object detection by utilizing uncertainties of an unidentified object. The steps outlined herein are exemplary and can be implemented in any combination thereof, including combinations that exclude, add, or modify certain steps.

At step 602, method 600 can include receiving, by an autonomous vehicle system, a frame of a scene with a detected object. The method can be a pre-non-maximum suppression (NMS) ensemble process.

At step 604, method 600 can include estimating, by the autonomous vehicle system, an overall probability of the detected object in the frame. The estimating of the overall probability can include at least one of estimating an expected intersection over union (IoU) with an associated ground-truth (GT) object or estimating a true-positive (TP) rate based on a fixed IoU threshold.

At step 606, method 600 can include estimating, by the autonomous vehicle system, covariances for each state of at least one bounding box. The states of the at least one bounding box can include a centroid, a heading, a width, and a length. The estimating of the covariances can include at least one of utilizing a fixed covariance matrix, utilizing a polynomial fit or look-up-table from detections compared to ground truth, or modifying a model to estimate covariance per-detection. The polynomial fit can be a function of attributes that are associated online.

The method 600 can further include generating a distance metric based on a respective feature of each of the at least one bounding box, and scaling the distance metric to a value between and including 0 and 1.

At step 608, method 600 can include balancing, by the autonomous vehicle system, confidence values of the at least one bounding box based on the overall probability of the detected object and the covariances of each state of the at least one bounding box.

Figure 7:
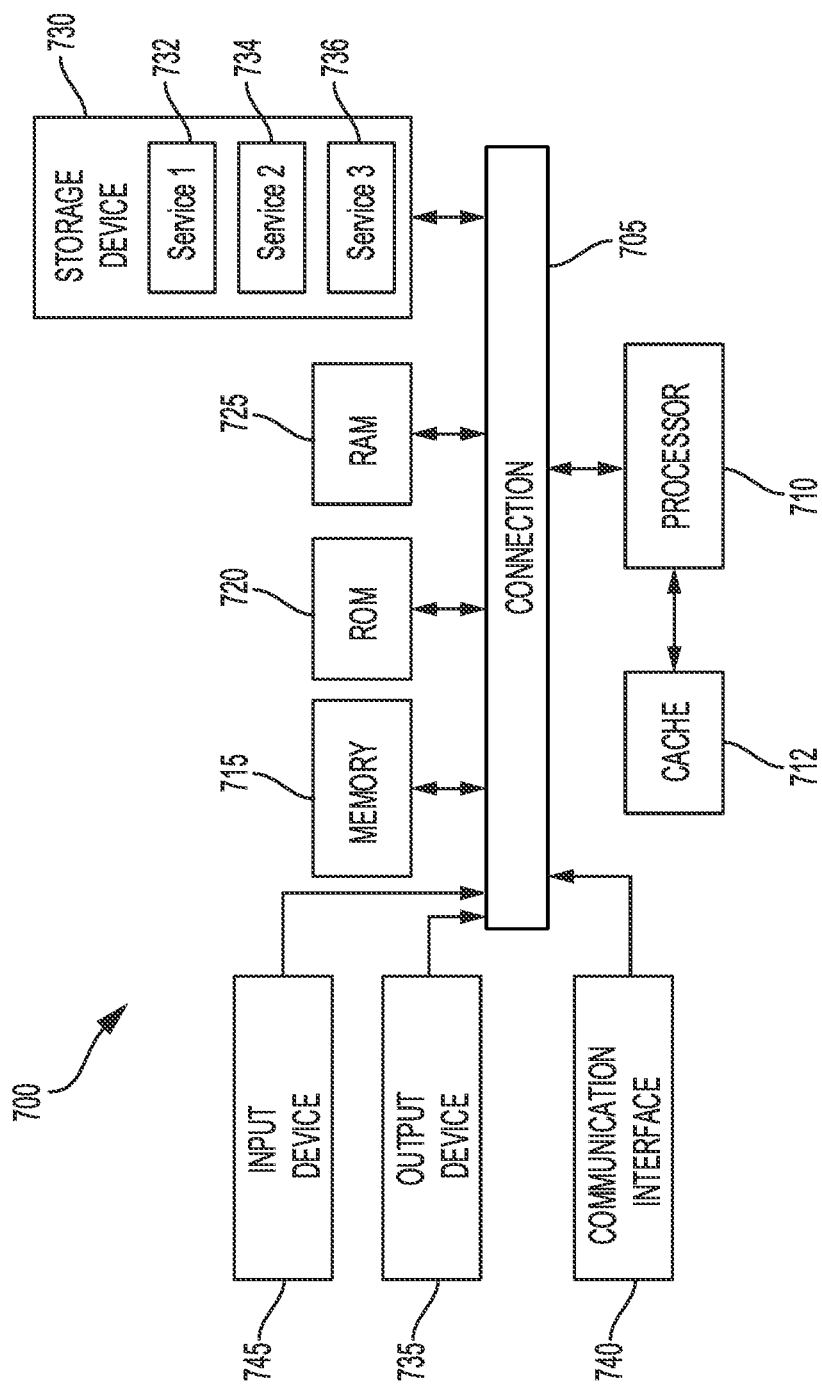
FIG. 7 illustrates an example processor-based system with which some aspects of the subject technology can be implemented.

FIG. 7 illustrates an example processor-based system with which some aspects of the subject technology can be implemented. For example, processor-based system 700 that can be any computing device making up local computing device 110, data center 150, client computing device 170, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, and/or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. By way of example computer-executable instructions can be used to implement perception system functionality for determining when sensor cleaning operations are needed or should begin. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method for detecting objects, the computer-implemented method comprising:
    receiving, by an autonomous vehicle system, a frame of a scene with a detected object;
    estimating, by the autonomous vehicle system, an overall probability of the detected object in the frame;
    estimating, by the autonomous vehicle system, covariances for each state of at least one bounding box;
    balancing, by the autonomous vehicle system, confidence values of the at least one bounding box based on the overall probability of the detected object and the covariances of each state of the at least one bounding box;
    generating a distance metric based on a respective feature of each of the at least one bounding box; and
    scaling the distance metric to a value between and including 0 and 1.

2. The computer-implemented method of claim 1, wherein the computer-implemented method is a pre-non-maximum suppression (NMS) ensemble process.

3. The computer-implemented method of claim 1, wherein the estimating of the overall probability includes at least one of estimating an expected intersection over union (IoU) with an associated ground-truth (GT) object or estimating a true-positive (TP) rate based on a fixed IoU threshold.

4. The computer-implemented method of claim 1, wherein the states of the at least one bounding box includes a centroid, a heading, a width, and a length.

5. The computer-implemented method of claim 1, wherein the estimating of the covariances includes at least one of utilizing a fixed covariance matrix, utilizing a polynomial fit or look-up-table from detections compared to ground truth, or modifying a model to estimate covariance per-detection.

6. The computer-implemented method of claim 5, wherein the polynomial fit is a function of attributes that are associated online.

7. A system for detecting objects, the system comprising:
    one or more processors; and
    at least one non-transitory computer-readable storage medium having stored therein instructions which, when executed by the one or more processors, cause the system to:
      receive a frame of a scene with a detected object;
      estimate an overall probability of the detected object in the frame;
      estimate covariances for each state of at least one bounding box;
      balance confidence values of the at least one bounding box based on the overall probability of the detected object and the covariances of each state of the at least one bounding box;
      generate a distance metric based on a respective feature of each of the at least one bounding box; and
      scale the distance metric to a value between and including 0 and 1.

8. The system of claim 7, wherein the system is a pre-non-maximum suppression (NMS) ensemble system.

9. The system of claim 7, wherein the estimation of the overall probability includes at least one of estimating an expected IoU with an associated GT object or estimating a TP rate based on a fixed IoU threshold.

10. The system of claim 7, wherein the states of the at least one bounding box includes a centroid, a heading, a width, and a length.

11. The system of claim 7, wherein the estimation of the covariances includes at least one of utilizing a fixed covariance matrix, utilizing a polynomial fit or look-up-table from detections compared to ground truth, or modifying a model to estimate covariance per-detection.

12. The system of claim 11, wherein the polynomial fit is a function of attributes that are associated online.

13. A non-transitory computer-readable storage medium comprising:
instructions stored on the non-transitory computer-readable storage medium, the instructions, when executed by one or more processors, cause the one or more processors to:
receive a frame of a scene with a detected object;
estimate an overall probability of the detected object in the frame;
estimate covariances for each state of at least one bounding box; and
balance confidence values of the at least one bounding box based on the overall probability of the detected object and the covariances of each state of the at least one bounding box;
generate a distance metric based on a respective feature of each of the at least one bounding box; and
scale the distance metric to a value between and including 0 and 1.

14. The non-transitory computer-readable storage medium of claim 13, wherein the estimation of the overall probability includes at least one of estimating an expected IoU with an associated GT object or estimating a TP rate based on a fixed IoU threshold.

15. The non-transitory computer-readable storage medium of claim 13, wherein the states of the at least one bounding box includes a centroid, a heading, a width, and a length.

16. The non-transitory computer-readable storage medium of claim 13, wherein the estimation of the covariances includes at least one of utilizing a fixed covariance matrix, utilizing a polynomial fit or look-up-table from detections compared to ground truth, or modifying a model to estimate covariance per-detection.

17. The non-transitory computer-readable storage medium of claim 16, wherein the polynomial fit is a function of attributes that are associated online.

* * * * *